US012754040B2

(12) United States Patent
Khan et al.

(10) Patent No.: US 12,754,040 B2
(45) Date of Patent: Oct. 6, 2026

(54) METHOD AND APPARATUS FOR CREATING A DIGITAL MAP

(71) Applicant: Robert Bosch GmbH, Stuttgart (DE)

(72) Inventors: Muhammad Sheraz Khan, Heilbronn (DE); Philipp Ruchti, Aspach (DE); Carsten Hasberg, Ilsfeld-Auenstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/758,087

(22) Filed: Jun. 28, 2024

(65) Prior Publication Data

US 2025/0020482 A1 Jan. 16, 2025

(30) Foreign Application Priority Data

Jul. 10, 2023 (DE) ..................... 10 2023 206 518.5

(51) Int. Cl.
*G01C 21/00* (2006.01)

(52) U.S. Cl.
CPC ................................ *G01C 21/3848* (2020.08)

(58) Field of Classification Search
None
See application file for complete search history.

(56) References Cited

U.S. PATENT DOCUMENTS

2018/0188059 A1 7/2018 Wheeler et al.
2019/0360820 A1* 11/2019 Svensson ........... G01C 21/3848
2020/0134866 A1* 4/2020 Kitaura ..................... G06T 7/74

FOREIGN PATENT DOCUMENTS

DE 102016216154 A1 3/2018
DE 102022209990 A1 4/2023
EP 3862721 A1 8/2021

* cited by examiner

*Primary Examiner* — Hongye Liang
(74) *Attorney, Agent, or Firm* — Norton Rose Fulbright US LLP

(57) ABSTRACT

A method and apparatus for creating a digital map. The method includes: receiving surrounding area data value sets, each set being detected using an environmental sensor system of a vehicle traveling along a traffic route, wherein each surrounding area data value set includes surrounding area features and a position of the surrounding area features; creating the digital map, wherein in the creating, the surrounding area features of the surrounding area data sets are sorted into groups depending on their position, a spatial arrangement of the respective surrounding area features relative to one another is determined for each group, an optimized position of the surrounding area features of the group is determined for each group without changing the spatial arrangement, and the digital map is created depending on the optimized position of the surrounding area features of each group; and providing the digital map.

5 Claims, 1 Drawing Sheet

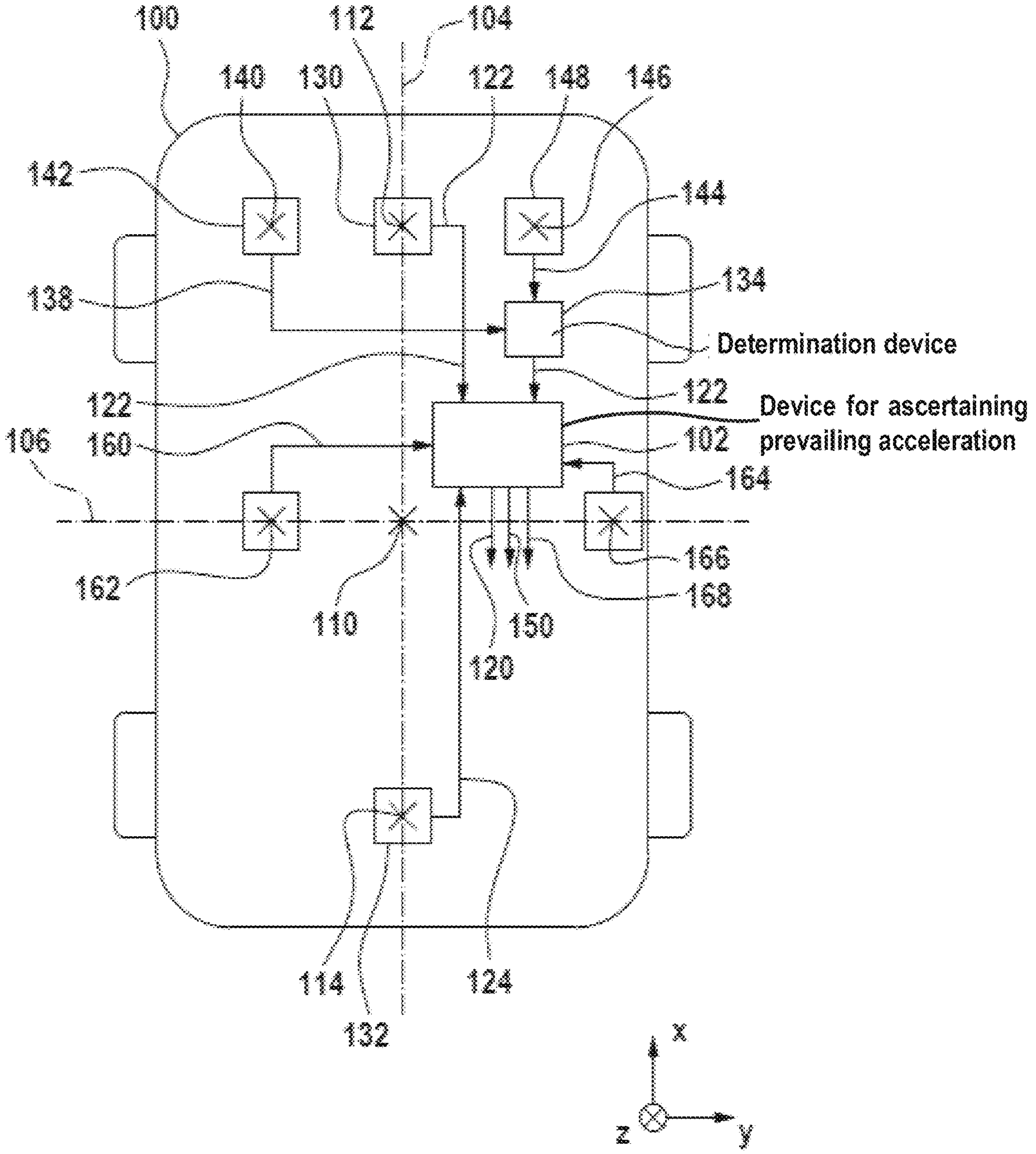
100
112
104
140
130
122
148
146
142
144
138
134
Determination device
122
122
Device for ascertaining prevailing acceleration
106
160
102
164
162
110
166
168
150
120
114
124
132
x
z
y

METHOD AND APPARATUS FOR CREATING A DIGITAL MAP

CROSS REFERENCE

The present application claims the benefit under 35 U.S.C. § 119 of German Patent Application No. 10 2023 206 518.5 filed on Jul. 10, 2023, which is expressly incorporated herein by reference in its entirety.

FIELD

The present invention relates, inter alia, to a method for creating a digital map that represents at least one region along a traffic route, comprising a step of receiving a plurality of surrounding area data value sets, wherein each surrounding area data value set comprises surrounding area features; a step of creating the digital map depending on the surrounding area features; and a step of providing the digital map.

SUMMARY

According to an example embodiment of the present invention, the method for creating a digital map that represents at least one region along a traffic route comprises a step of receiving a plurality of surrounding area data value sets, wherein each surrounding area data value set is detected by means of an environmental sensor system of a vehicle traveling along the traffic route, wherein each surrounding area data value set comprises surrounding area features and a position of said surrounding area features. The method further comprises a step of creating the digital map, wherein in a first sub-step, the surrounding area features of the surrounding area data sets are sorted into groups depending on their position, wherein in a second sub-step, a spatial arrangement of the respective surrounding area features relative to one another is determined for each group, wherein in a third sub-step, an optimized position of the surrounding area features of said group is determined for each group without changing the spatial arrangement, wherein in a fourth sub-step, the digital map is created depending on the optimized position of the surrounding area features of each group; and a step of providing the digital map.

A traffic route is, for example, a single-lane or multi-lane road. A region along a traffic route is understood to mean, for example, the traffic route itself along with a strip to the left and/or right of the traffic route. The width of the strip depends, for example, on the specific configuration of the surrounding area and/or the sensor range of the individual vehicles. As a rule, this strip comprises surrounding area features such as traffic signs, etc.

An environmental sensor system is understood to mean at least one video sensor and/or at least one radar sensor and/or at least one lidar sensor and/or at least one ultrasonic sensor and/or at least one further sensor that is designed to detect a surrounding area of a vehicle in the form of sensor data values. In one possible embodiment, the environmental sensor system comprises, for example, a computing unit (processor, working memory, hard drive) with suitable software and/or is connected to such a computing unit for this purpose.

A surrounding area feature is, for example, understood here to mean an infrastructure feature (roadway boundary lines, guardrails, etc.) and/or a traffic sign (road signs, traffic lights, etc.) and/or a structural feature (buildings, bridges, tunnels, etc.) and/or a further feature that can be detected by means of an environmental sensor system.

A digital map is understood to mean a map that is present in the form of (map) data values on a storage medium. For example, the map is designed to comprise one or more map layers, wherein one map layer, for example, shows a map from the bird's eye view (course and position of roads, buildings, landscape features, etc.). This corresponds to a map of a navigation system, for example. A further map layer comprises, for example, a radar map, wherein surrounding area features comprised by the radar map are stored along with a radar signature. A further map layer comprises, for example, a lidar map, wherein surrounding area features comprised by the lidar map are stored along with a lidar signature.

In one example embodiment of the present invention, the map is designed as a highly accurate map. The highly accurate map is in particular designed in such a way that it is suitable for the navigation of an automated vehicle. This is understood, for example, to mean that the highly accurate map is designed to determine a highly accurate position of the automated vehicle by comparing stored surrounding area features with detected sensor data values of this automated vehicle. For this purpose, the highly accurate map, for example, comprises these surrounding area features along with highly accurate position specifications (coordinates). In this context, a map is understood to mean a globally accurate map A highly accurate position is understood to mean a position which is accurate within a specified coordinate system, e.g., WGS84 coordinates, in such a way that this position does not exceed a maximum permitted uncertainty. The maximum uncertainty may depend on the surrounding area, for example. Furthermore, the maximum uncertainty can depend, for example, on whether a vehicle is operated manually or in a partially, highly or fully automated manner (corresponding to one of SAE levels 1 to 5). In principle, the maximum uncertainty is so low that safe operation of the automated vehicle is in particular ensured. For a fully automated operation of the automated vehicle, the maximum uncertainty is, for example, in an order of magnitude of approximately 10 centimeters.

Creating the digital map is understood to mean, for example, that surrounding area features that are comprised by the surrounding area data values are newly integrated into a base map according to their (optimized) position and/or surrounding area features already comprised by the base map are removed or adapted accordingly. Here, a base map is understood to mean in particular a digital map (as described above).

The method mentioned here according to the present invention advantageously achieves the object of providing a method for creating a digital map. This object is achieved by means of the method according to the present invention in that the surrounding area features provided for this purpose are sorted into groups depending on their position and a spatial arrangement of the respective surrounding area features in relation to one another is determined for each group. Subsequently, for each group, an optimized position of the surrounding area features of this group is determined without changing the relative spatial arrangement. This shows the advantage that, due to the plurality of surrounding area data value sets, individual errors or deviations in the positions of the surrounding area features, which can occur in satellite-based positioning systems, for example due to multipath effects or atmospheric disturbances, can be compensated for and optimized positions can be determined without changing the relative positions of said surrounding area features with respect to each other.

According to an example embodiment of the present invention, preferably, the spatial arrangement of the respective surrounding area features of a group comprises distances and/or angles between said surrounding area features.

According to an example embodiment of the present invention, preferably, for each surrounding area feature, the position of the corresponding surrounding area feature is determined from a combination of a vehicle position of the vehicle that detects said surrounding area feature and a relative position of said surrounding area feature with respect to this vehicle and is assigned to said surrounding area feature. The vehicle position of the vehicle is determined by means of a satellite-based positioning system for said vehicle and the relative position is determined from the corresponding surrounding area data set.

A position of the environmental feature is, for example, understood to mean a 3D specification in a specified coordinate system, e.g., WGS84 coordinates.

A combination of the vehicle position and the relative position of a surrounding area feature is understood to mean, for example, a vector addition of the coordinates of the vehicle position and the direction vector between this position and the position of the surrounding area feature.

According to an example embodiment of the present invention, preferably, the digital map is provided in such a way that the digital map can be requested and/or received by a vehicle, in particular an automated vehicle.

A vehicle is, for example, understood to mean a manually operated vehicle (SAE level 0) or an automated vehicle in accordance with one of SAE levels 1 to 5 (see SAE J3016 standard).

Operating the vehicle means, for example, performing lateral and/or longitudinal control (depending on the SAE level or the design of the [automated] vehicle). In one possible embodiment, the operation also comprises, for example, the execution of safety-related functions ("arming" an airbag, fastening seat belts, etc.) and/or other (driver assistance) functions.

According to an example embodiment of the present invention, the apparatus, in particular a computing unit, is configured to perform all steps of the method for creating a digital map. A computing unit means, for example, a server or a server network or a cloud.

According to an example embodiment of the present invention, the apparatus or computing unit comprises a processor, working memory, storage medium, and suitable software in order to perform the method according to the present invention. Furthermore, the apparatus comprises an interface in order to transmit and receive data values by means of a wired and/or wireless connection, for example with corresponding devices of vehicles (control units, communication devices, environmental sensor system, navigation system, etc.) and/or further off-board devices (server, cloud, etc.).

Furthermore, a computer program is provided according to the present invention, comprising commands that, when the computer program is executed by a computer, cause the computer to carry out a method according to the present invention. In one embodiment, the computer program corresponds to the software comprised by the second apparatus.

Furthermore, a machine-readable storage medium on which the computer program is stored is provided according to the present invention.

Advantageous developments of the present invention are disclosed herein.

BRIEF DESCRIPTION OF THE DRAWING

Exemplary embodiments of the present invention are shown in the figures and explained in more detail in the following description.

FIG. 1 shows an exemplary embodiment of the method according to the present invention for creating a digital map in the form of a flow chart.

DETAILED DESCRIPTION OF EXAMPLE EMBODIMENTS

FIG. 1 shows an exemplary embodiment of a method 300 for creating 320 a digital map that represents at least one region along a traffic route.

In step 301, the method 300 starts.

In step 310, a plurality of surrounding area data value sets are received, wherein each surrounding area data value set is detected by means of an environmental sensor system of a vehicle traveling on the traffic route, wherein each surrounding area data value set comprises surrounding area features and a position of said surrounding area features.

In step 320, the digital map is created, which step comprises the four sub-steps 321-324.

In the first sub-step 321, the surrounding area features of the surrounding area data sets are sorted into groups depending on their position. Surrounding area features that are within a certain proximity according to predefined criteria (e.g. a maximum distance from each other) are grouped together.

In the second sub-step 322, a spatial arrangement of the respective surrounding area features relative to one another is determined for each group.

In the third sub-step 323, for each group, an optimized position of the surrounding area features of said group is determined without changing the relative spatial arrangement. For each group, optimized positions are determined from the plurality of individual positions of all surrounding area features taken into account. The relative spatial arrangement of the surrounding area features of a group remains unchanged.

In the fourth sub-step 324, the digital map is created depending on the optimized position of the surrounding area features of each group.

In step 330, the digital map is provided.

In step 340, the method 300 ends.

What is claimed is:

1. A method for vehicle navigation using a digital map that represents at least one region along a traffic route, the method comprising the following steps:

receiving a plurality of surrounding area data value sets, wherein each surrounding area data value set includes (a) surrounding area features detected, during a respective sensing instance of an at least partially automated vehicle that is traveling along the traffic route, by an environmental sensor system of the vehicle, and (b) sensor-based position information associated with the surrounding area features;

identifying, from the surrounding area features comprised by different ones of the surrounding area data value sets and based on the sensor-based position information, a plurality of feature groups, each of the feature groups comprising a respective plurality of distinct ones of the surrounding area features that are located within a predefined spatial proximity and that collectively define a spatial arrangement relative to one another;

for each of the feature groups, determining, based on satellite-based position information received from a satellite-based positioning system that indicates differing absolute positions for respective ones of the surrounding area features of the respective feature group, an adjusted absolute positioning of the respective feature group in a global coordinate system by modifying the absolute positions associated with one or more of the surrounding area features of the respective feature group in a coordinated manner, subject to a constraint that the spatial arrangement of the surrounding area features of the respective feature group relative to one another is maintained unchanged;

creating the digital map based on the adjusted absolute positioning of the feature groups; and navigating the vehicle, including controlling longitudinal and/or lateral motion of the vehicle, during continued travel along the traffic route, using the digital map created based on the adjusted absolute positioning of the feature groups.

2. The method according to claim 1, wherein the spatial arrangement of the respective surrounding area features of each group includes distances and/or angles between the respective surrounding area features.

3. The method according to claim 1, wherein, for each surrounding area feature, the sensor-based position information of the surrounding area feature is determined from a combination of a vehicle position of the vehicle using the satellite-based positioning system, and a relative position of the surrounding area feature to the vehicle, wherein the relative position is determined from the surrounding area data value sets.

4. An apparatus, comprising:

a computing unit, wherein, for vehicle navigation using a digital map that represents at least one region along a traffic route, the computing unit is configured to:

receive a plurality of surrounding area data value sets, wherein each surrounding area data value set includes (a) surrounding area features detected, during a respective sensing instance of an at least partially automated vehicle that is traveling along the traffic route, by an environmental sensor system of the vehicle and (b) sensor-based position information associated with of the surrounding area features;

identify, from the surrounding area features comprised by different ones of the surrounding area data value sets and based on the sensor-based position information, a plurality of feature groups, each of the feature groups comprising a respective plurality of distinct ones of the surrounding area features that are located within a predefined spatial proximity and that collectively define a spatial arrangement relative to one another;

for each of the feature groups, determine, based on satellite-based position information received from a satellite-based positioning system that indicates differing absolute positions for respective ones of the surrounding area features of the respective feature group, an adjusted absolute positioning of the respective feature group in a global coordinate system by modifying the absolute positions associated with one or more of the surrounding area features of the respective feature group in a coordinated manner, subject to a constraint that the spatial arrangement of the surrounding area features of the respective feature group relative to one another is maintained unchanged;

create the digital map based on the adjusted absolute positioning of the feature groups; and navigate the vehicle, including controlling longitudinal and/or lateral motion of the vehicle, during continued travel along the traffic route, using the digital map created based on the adjusted absolute positioning of the feature groups.

5. A non-transitory machine-readable storage medium on which is stored a computer program for vehicle navigation using a digital map that represents at least one region along a traffic route, the computer program, when executed by a computer, causing the computer to perform the following steps:

receiving a plurality of surrounding area data value sets, wherein each surrounding area data value set includes (a) surrounding area features detected, during a respective sensing instance of an at least partially automated vehicle that is traveling along the traffic route, by an environmental sensor system of the vehicle and (b) sensor-based position information associated with the surrounding area features;

identifying, from the surrounding area features comprised by different ones of the surrounding area data value sets and based on the sensor-based position information, a plurality of feature groups, each of the feature groups comprising a respective plurality of distinct ones of the surrounding area features that are located within a predefined spatial proximity and that collectively define a spatial arrangement relative to one another;

for each of the feature groups, determining, based on satellite-based position information received from a satellite-based positioning system that indicates differing absolute positions for respective ones of the surrounding area features of the respective feature group, an adjusted absolute positioning of the respective feature group in a global coordinate system by modifying the absolute positions associated with one or more of the surrounding area features of the respective feature group in a coordinated manner, subject to a constraint that the spatial arrangement of the surrounding area features of the respective feature group relative to one another is maintained unchanged;

creating the digital map based on the adjusted absolute positioning of the feature groups; and navigating the vehicle, including controlling longitudinal and/or lateral motion of the vehicle, during continued travel along the traffic route, using the digital map created based on the adjusted absolute positioning of the feature groups.

* * * * *